United States Patent [19]
Sussman

[11] Patent Number: 5,900,975
[45] Date of Patent: May 4, 1999

[54] GHOST IMAGE EXTINCTION IN AN ACTIVE RANGE SENSOR

[75] Inventor: Michael Sussman, Winchester, Mass.

[73] Assignee: Cognex Corporation, Natick, Mass.

[21] Appl. No.: 08/961,177

[22] Filed: Oct. 30, 1997

[51] Int. Cl.$^6$ ................................................. G02B 5/30
[52] U.S. Cl. ..................... 359/493; 359/501; 359/601; 359/629; 250/559.38; 356/4.04
[58] Field of Search ................................. 359/485, 493, 359/501, 601, 602, 603, 608, 629; 250/559.38; 356/4.04

[56] References Cited

U.S. PATENT DOCUMENTS

| | | | |
|---|---|---|---|
| 4,501,961 | 2/1985 | Stauffer | 250/559.38 |
| 5,164,857 | 11/1992 | Lin | 359/629 |
| 5,406,938 | 4/1995 | Mersch et al. | 359/493 |

Primary Examiner—Cassandra Spyrou
Assistant Examiner—Darren E. Schuberg
Attorney, Agent, or Firm—Russ Weinzimmer

[57] ABSTRACT

An apparatus is provided that includes a plate beamsplitter having a first surface coated with a partially reflective coating, and a second surface coated with an anti-reflective coating, and a polarizing filter, oriented with respect to the plate beamsplitter so as to substantially block light of substantially incompatible polarization that has traversed the plate beamsplitter, has been reflected by the object to be range imaged, and has been reflected by the plate beamsplitter towards the polarizing filter, thereby substantially preventing the formation of a ghost image of the object to be range imaged. Thus, the invention does not suffer from optical ghost images which commonly occur due to imperfect anti-reflection coatings used to make plate beam splitters. Also, the invention makes practical the use of plate beam splitters in depth from defocus and depth from focus range imaging systems employing coaxial active illumination and viewing.

5 Claims, 5 Drawing Sheets

GHOST IMAGE EXTINCTION IN AN ACTIVE RANGE SENSOR

FIELD OF THE INVENTION

This invention relates to machine vision, and particularly to range imaging in a machine vision system.

BACKGROUND OF THE INVENTION

A standard image, such as an image provided by a video camera having a CCD (charge coupled device) image sensor, consists of a collection of picture elements, i.e., "pixels", where each pixel represents the brightness of a point on an object as detected at the image sensor. A range image consists of an collection of range elements, each range element representing the distance of a point on an object from a range imaging sensor. Range imaging has important industrial applications. For example, a machine vision system employing a range imaging sensor can inspect lead co-planarity of the leads of semiconductor packages in an automated quality control system.

Popular techniques for range imaging include laser triangulation and light striping. Both techniques rely on the use of an illumination source and sensing means located at different angles with respect to the object being viewed. Shifts in the sensed illumination intensity are due to height (range) differences over the surface of the object. A principal difficulty encountered with these systems is that the angled configuration unavoidably creates shadow regions which result in regions of the surface of the object where the height differences cannot be measured.

A class of range sensing techniques have been developed which employ the focal characteristics of lenses to obtain height (also range or depth) measurements. Noguchi and Nayer in "Microscopic Shape from Focus Using Active Illumination", 12th Proceedings IAPR International Conference on Pattern Recognition, pp.147–152, Jerusalem, Israel, October 1994, herein incorporated by reference, describe a system which computes depth from focus using a set of many images taken in conjunction with incremental z motion of an object, where z motion is defined as motion along the optical axis of a camera of the range sensor. This system uses projected structured (active) illumination to superimpose a strong artificial texture on otherwise smooth objects, to permit accurate sensing of best focus on such objects. The active illumination is projected onto the object through a beam splitter. Light reflected off of the object is split by the beamsplitter and focused by an imaging lens onto an electronic camera. The use of the beamsplitter provides coaxial illumination and viewing, thereby solving the shadowing problem encountered with triangulation-based systems.

In S. K. Nayer, M. Watanabe, M. Noguchi, "Real-Time Focus Range Sensor", IEEE Trans. Pattern Analysis and Machine Intelligence, vol. 18, no. 12, pp. 1186–1196, December 1996, herein incorporated by reference, there is described a range imaging sensor using active illumination and two images of the object taken at two respective focal positions. In this case, range is locally determined by comparison of the degree of defocus in the two images. This comparison is made possible by ensuring that the known spatial frequency spectrum of the projected active illumination dominates the apparent texture of the object. A beamsplitter is again employed to provide a viewing path that is coaxial with respect to the illumination path. This coaxial relationship between the illumination path and the viewing path also greatly simplifies the depth computation, since any one position in the two images is known to correspond exactly to one point at the object. However, the introduction of a beamsplitter into the optical path produces some undesirable optical effects.

Plate beamsplitters are common optical elements. A plate beamsplitter typically consists of a thin plate of flat glass, the glass plate having a thin reflective coating applied to one side of the plate. The coating thickness is chosen so that nearly half of the light incident at 45 degrees to the plate is reflected, and nearly half is transmitted, thus splitting the light into two components, the directions of the components being separated by 90 degrees. The uncoated side of the plate will unavoidably also reflect some of the incident light.

Referring to FIG. 1, the incident ray 10 is split on the first surface 12 of the beamsplitter plate 14 into reflected and refracted component rays 16 and 18, respectively. The refracted ray 18 is again partially reflected at the second surface 20, as it leaves the plate 14. The ray reflected off of the second surface is herein called the ghost ray 22, which ray is separated from the desired first reflected ray 16 by Equation 1:

$$d = \sqrt{2t^2} \qquad \text{Equation 1}$$

where t is the thickness of the glass plate 14 and d is the distance separating the two rays 16, 22.

The ghost ray 22 is so named because the second surface reflection effect produces a duplicate image at the camera which is displaced by distance 'd' from the desired image. For example, if the plate 14 is 3 mm thick, the ghost is displaced by 4.24 mm. Since it is the relative degree of defocus, and not absolute contrast, that is used to compute depth by focus and defocus, the ghost image creates large measurement errors in a depth by focus or depth by defocus range imaging system.

Plate beamsplitters typically have an anti-reflective coating applied to the second surface 20 of the plate 14. Using good quality broadband coatings, the reflected light ghost can be reduced in this way to around 1%. Broadband anti-reflective coatings are used because broadband illumination is preferred in range sensors to eliminate color dependency. However, due to the sensitivity of the depth by focus and defocus techniques to ghosting, large measurement errors result nevertheless.

Other types of beamsplitters are typically used when ghosts must be eliminated. The cube type beamsplitter eliminates ghosting because there is only one 45 degree surface employed. However, cube beamsplitters are expensive and introduce very thick glass wedges into the optical path. The resulting spherical aberration, due to angle-dependent refractive shifting in the thick glass, severely degrades the performance of imaging lenses, requiring provision of special compensating optics, thereby further increasing cost. Moreover, the unused backside of the cube can cause light scattering, thereby decreasing image contrast, and consequently decreasing measurement accuracy.

Pellicle-type beamsplitters consist of a nitrocellulose membrane on an optically flat frame. The membrane is coated to form a beamsplitter which is similar to the plate type, except that thickness 't' is on the order of 2 $\mu$m. Thus, the ghost image is practically superimposed on the desired image. However, pellicle-type beamsplitters are much more expensive than simple plate beamsplitters, and are undesireably fragile.

SUMMARY OF THE INVENTION

One general aspect of the invention is an apparatus for providing a substantially ghost-free image of a surface of an object to be range imaged that includes a plate beamsplitter having a first surface coated with a partially reflective coating, and a second surface coated with an anti-reflective coating. The apparatus also includes a polarizing filter, oriented with respect to the plate beamsplitter so as to block light of incompatible polarization that has traversed the plate beamsplitter, has been reflected by the object to be range imaged, and then by the plate beamsplitter towards the polarizing filter, thereby substantially preventing the formation of a ghost image of the object to be range imaged.

In another aspect of the invention, the apparatus also includes a second polarizing filter so as to ensure that the object to be range imaged is illuminated with polarized light. In a preferred embodiment, the second polarizing filter is oriented with respect to the plate beamsplitter so as to minimize transmission of specular reflection through the apparatus.

According to another aspect of the invention, the invention eliminates beam splitter ghost images in range imaging sensors by exploiting an additional degree of freedom of a pair of polarizing filters originally dedicated to controlling the ratio of intensities of specular reflection to diffuse reflection from the surface of an object to be measured. Thus, in range sensors where a pair of polarizers is used to suppress specular reflection by the object, this invention leads to a precise preferred orientation of the polarizer-pair to extinguish ghost images.

The invention recognizes and exploits the fact that broadband anti-reflective optical coatings are much more anti-reflective of P-polarized light than of S polarized light in the visible portion of the electromagnetic spectrum, when used at a 45 degree angle to the incident light rays. Further, when a properly oriented polarizing filter is placed in the path of the reflected S-polarized rays so as to block S polarized light, no light ray due to second-side reflection at the beamsplitter is transmitted by the apparatus of the invention, thereby substantially eliminating formation of a ghost image.

BRIEF DESCRIPTION OF THE DRAWINGS

The invention will be more fully understood from the following detailed description, in conjunction with the accompanying figures, wherein.

DETAILED DESCRIPTION OF THE DRAWINGS

Figure 1:
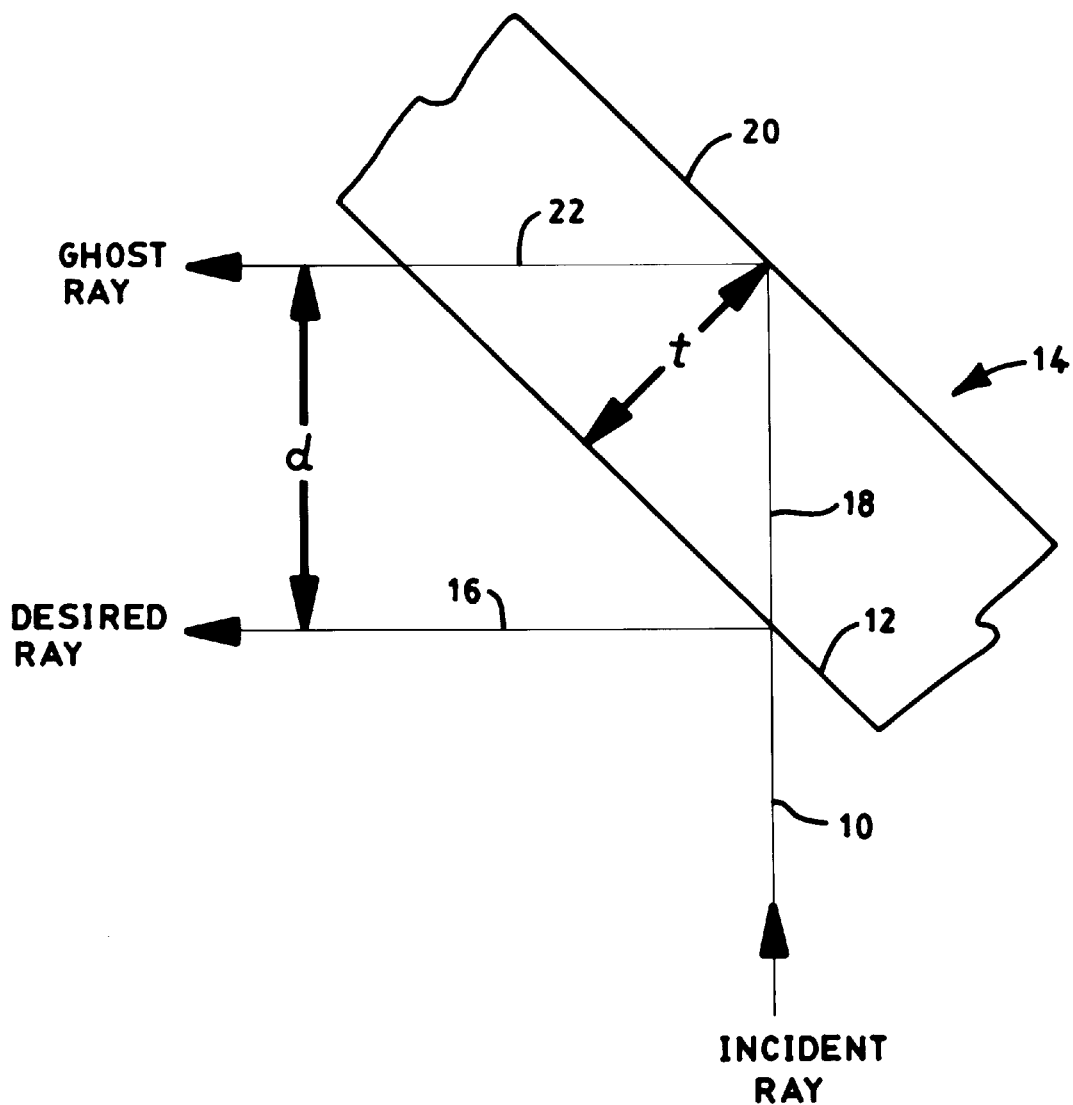
FIG. 1 shows a plate beamsplitter receiving an incident ray and providing a desired ray and a "ghost" ray.
Figure 2:
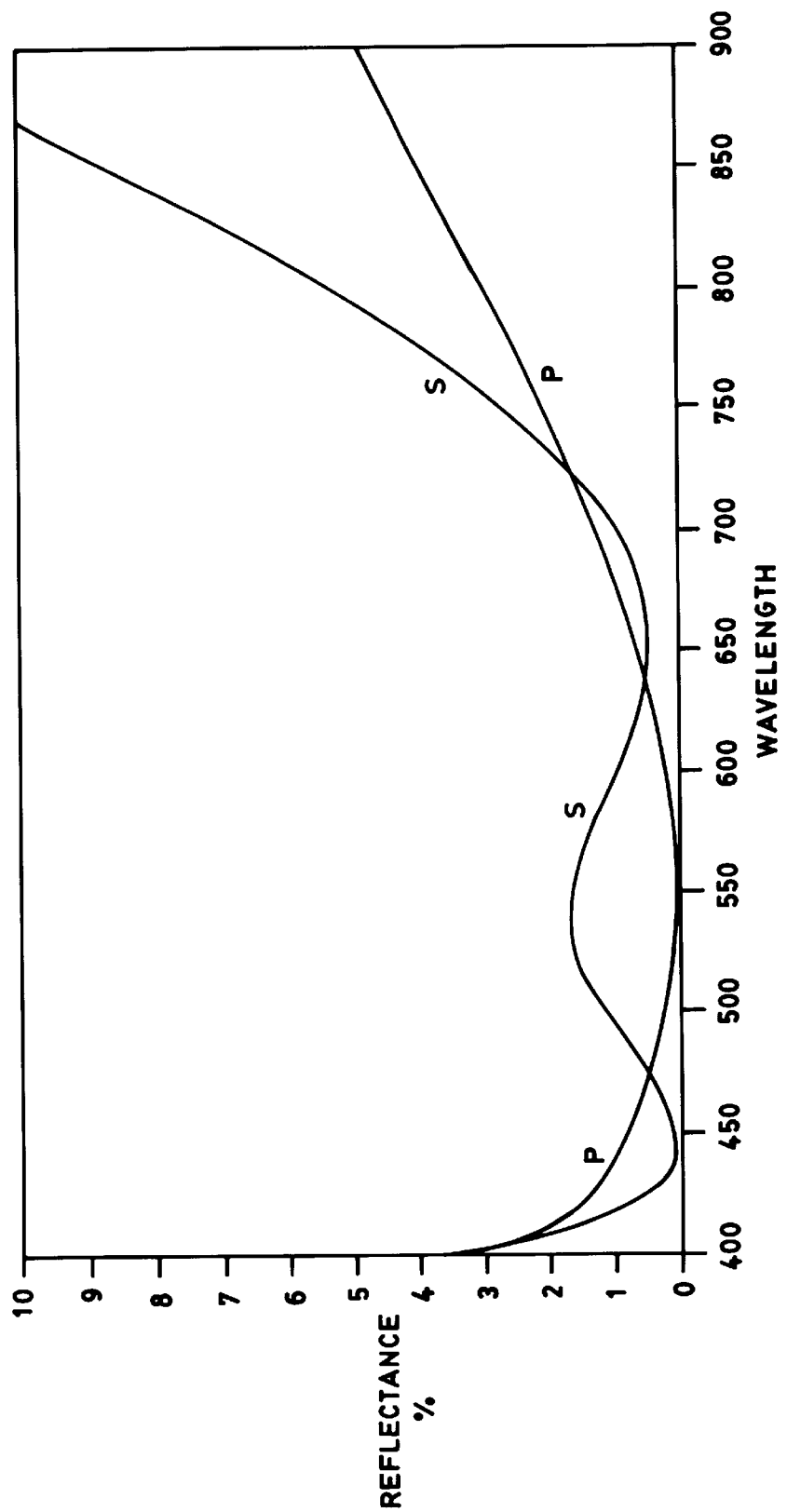
FIG. 2 is a plot of percent reflectance as a function of wavelength at a glass surface having an anti-reflective coating, with a light ray incident to the glass surface at 45 degrees.

FIG. 2 shows the reflectance at a 45 degree angle of incidence for a glass surface having an anti-reflective coating, such as the anti-reflective coating on the surface 20 of the glass plate 14 in FIG. 1. The coating in this data is trade-named HEBBAR /079 (high efficiency broadband anti reflection), manufactured by Melles Griot, Inc., Irvine, Calif. The coating is a multi-layer film deposited on the glass surface 20 combining materials of different respective indices of refraction. This product is representative of good quality broadband multi-layer anti-reflective coatings. The average reflected light at 45 degrees is just under 1% of the incident light across the visible range. This amount of second-surface reflection produces an unacceptable ghost image. However, as FIG. 2 shows, most of the reflected light is S-polarized. P-polarized reflection is completely extinguished near the center (around 550 nm) of the visible band.

Figure 3:
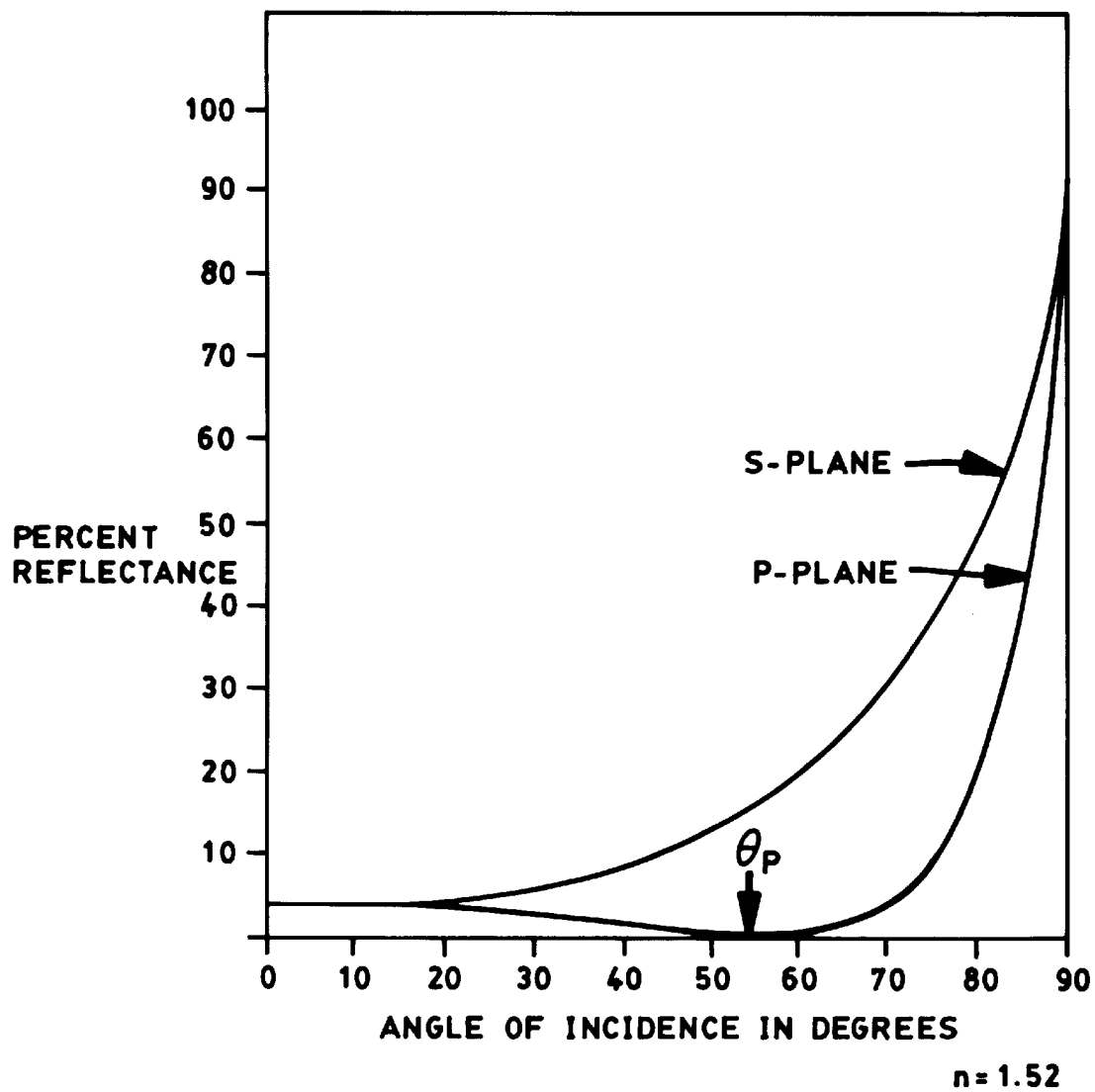
FIG. 3 is a plot of external reflection (percent reflectance) as a function of angle of incidence to a glass surface having an anti-reflective coating, showing both s- and p-polarized components.

FIG. 3 shows external reflection at an uncoated glass surface with index of refraction of 1.52. It can be seen that the P-polarized component is about 10 times less than the S-polarized component at a 45 degree angle, and that the P-polarized reflection is substantially eliminated at a 56 degree angle. This is known as Brewster's angle. It is this preferential reflection of S-polarized light which explains the effectiveness of optical coatings in suppressing the P-polarized component.

Figure 4:
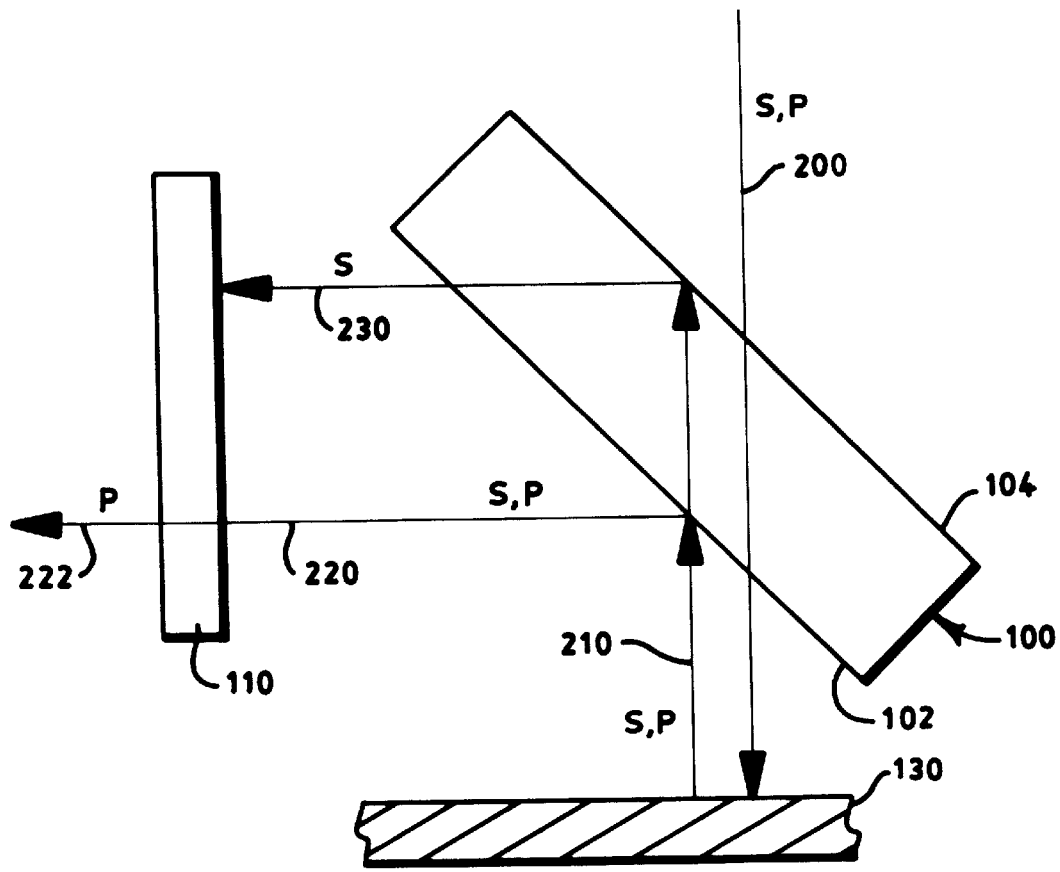
FIG. 4 is an embodiment of the invention including a plate beamsplitter having an anti-reflective coating according to the invention, and including a polarizer oriented with respect to the beamsplitter according to the invention.

FIG. 4 shows a preferred embodiment of the invention. Incident active illumination ray 200 passes through the partially reflective metallic coating 102 of plate beamsplitter 100 to illuminate object 130. For example, the partially reflective metallic coating 102 of plate beamsplitter 100 reflects 50% S-polarized light, and 50% P-polarized light. Light ray 210 is reflected off of object 130, and is shown displaced graphically with respect to ray 200 in FIG. 4 for illustration purposes only. Ray 210 is reflected off of the partially reflective metallic coating 102 of beamsplitter 100 to form ray 220 which passes through polarizer 110. Ray 210 is also partially transmitted by the coating 102 and is partially reflected off of the second surface 104 of beamsplitter 100, the second surface 104 having an anti-reflection coating, to form ghost ray 230. S-polarized ghost ray 230 is blocked by P-oriented (oriented so as to transmit P-polarized light) polarizer 110.

To understand how ghost ray 230 is blocked, note in FIG. 4 that ray 200 contains both S and P polarized components, as does reflected ray 210. Polarizer 110 is oriented to pass only the P-polarized component of ray 220. Ghost ray 230 consists only of S-polarized light due to the attenuating effect of reflection near Brewster's angle, and further attenuation by the anti-reflective coating at the second surface 104. Thus, ghost ray 230 is blocked by polarizer 110 and is not visible in the image formed by the P-polarized light rays 222.

Not shown in FIG. 4 are internal reflections of incident ray 200 off of beamsplitter coating 102 and again off of coated beamsplitter second surface 104 to reach object 130 with displacement given by Equation 1. This path forms a ghost image of the structured illumination pattern at the object. However, since this pattern is periodic and symmetrical, it's ghost image does not degrade the performance of a range imaging sensor.

Figure 5:
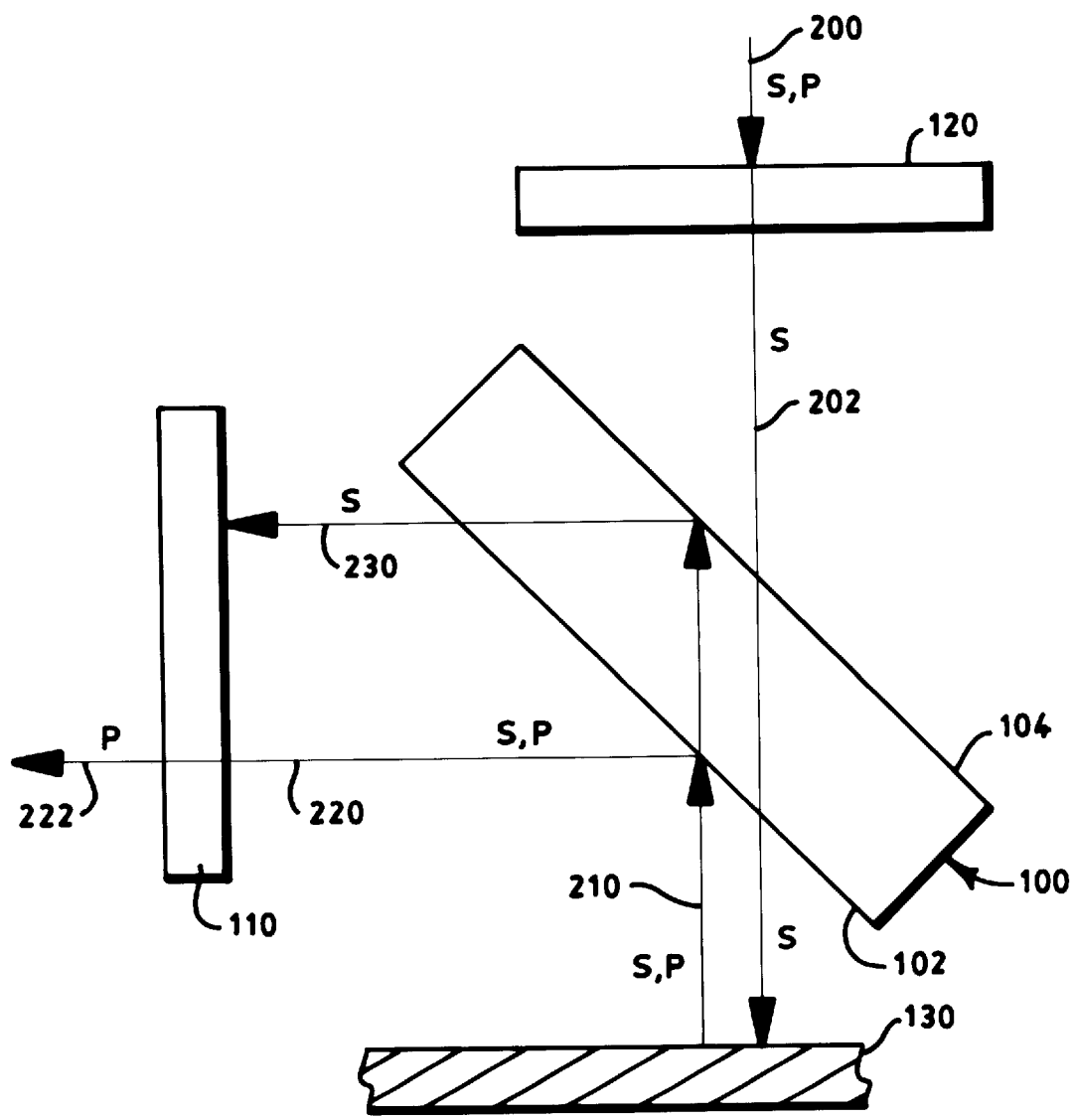
FIG. 5 is an embodiment of the invention including a plate beamsplitter having an anti-reflective coating according to the invention, and including a polarizer pair oriented with respect to each other according to the invention, and with respect to the beamsplitter according to the invention.

FIG. 5 shows a second preferred embodiment of the invention. Incident active illumination ray 200 having both S and P polarization components passes through polarizing element 120 as an S-polarized ray 202 before passing through the beamsplitter 100. Polarizer 120 is oriented so that only S-polarized light 202 reaches the object 130. Since polarizer 110 is oriented to pass only P-polarized light, as before, it might be expected that no light reflected by object 130 should pass through the system, assuming that object 130 is essentially specularly reflective. However, in general, object 130 can have both specular and diffuse components of reflection. Diffuse reflection at the surface of object 130 randomizes the field components of reflected ray 210, so that both S and P polarization is present. Thus, polarizer 110 passes only light 222 which has undergone diffuse reflection at the object. Light which results from specular reflection at object 130 is not passed by the system, because such specularly reflected light would be of S-polarization, and S-polarized light is not passed by the polarizer 110. Again, as in FIG. 4, FIG. 5 shows that polarizer 110 also blocks the S-polarized ghost ray 230.

The use of a pair of polarizers as in FIG. 5 has the feature of eliminating rays due to specular reflection, and passing only rays due to diffuse reflection. This has the advantage of reducing the dynamic range required of the system's camera, since much more light would otherwise be returned from a specular object surface normal to ray 200 than from a diffuse object. This invention teaches that in such a system, the pair of polarizers 110, 120 has a preferred orientation, such that polarizer 110 passes only P-polarized light, and polarizer 120 is then oriented to obtain maximum extinction of specular reflection. Further, this arrangement extinguishes the objectionable ghost image of the object, e.g., by not passing exemplary ghost ray 230.

Other modifications and implementations will occur to those skilled in the art without departing from the spirit and the scope of the invention as claimed. Accordingly, the above description is not intended to limit the invention except as indicated in the following claims.

What is claimed is:

1. An apparatus for providing a substantially ghost-free image of a surface of an object to be range imaged, the apparatus comprising:

a plate beamsplitter having a first surface coated with a partially reflective coating, and a second surface coated with an anti-reflective coating; and a polarizing filter, oriented with respect to the plate beamsplitter so as to substantially block light of substantially incompatible polarization that has traversed the plate beamsplitter, has been reflected by the object to be range imaged, and has been reflected by the plate beamsplitter towards the polarizing filter, thereby substantially preventing the formation of a ghost image of the object to be range imaged.

2. The apparatus of claim 1, further comprising:

a second polarizing filter ensuring that the object to be range imaged is illuminated with polarized light.

3. The apparatus of claim 2, wherein the second polarizing filter is oriented with respect to the plate beamsplitter so as to minimize transmission of specular reflection through the apparatus.

4. An apparatus for providing a substantially ghost-free image of a surface of an object to be range imaged, the apparatus comprising:

a plate beamsplitter having a first surface coated with a partially reflective coating, and a second surface coated with an anti-reflective coating;

a first polarizing filter for transmitting light of a first polarization, oriented with respect to the plate beamsplitter so as to substantially block light of substantially incompatible polarization that has traversed the plate beamsplitter, that has been reflected by the object to be range imaged, and has been reflected by the plate beamsplitter towards the polarizing filter, thereby substantially preventing the formation of a ghost image of the object to be range imaged; and a second polarizing filter for transmitting light of a second polarization, the second polarizing filter being oriented with respect to said first polarizing filter so as to minimize a ratio of specular reflection intensity to diffuse reflection intensity transmitted through the first polarizing filter.

5. An apparatus for providing a substantially ghost-free image of a surface of an object to be range imaged, the apparatus comprising:

a plate beamsplitter having a first surface coated with a partially reflective coating, and a second surface coated with an anti-reflective coating;

a first polarizing filter transmitting light of a first polarization, oriented with respect to the plate beamsplitter so as to substantially block light of substantially incompatible polarization that has traversed the plate beamsplitter, that has been reflected by the object to be range imaged, and has been reflected by the plate beamsplitter towards the polarizing filter, thereby substantially preventing the formation of a ghost image of the object to be range imaged; and a second polarizing filter transmitting light of a second polarization, the second polarizing filter being adjustably oriented with respect to said first polarizing filter so as to adjust a ratio of specular reflection intensity to diffuse reflection intensity transmitted through the first polarizing filter.

\* \* \* \* \*